(12) United States Patent
Schmid et al.

(10) Patent No.: US 9,376,087 B2
(45) Date of Patent: Jun. 28, 2016

(54) FRONT MODULE OF A MOTOR VEHICLE

(71) Applicant: Dr. Ing. h.c. F. Porsche Aktiengesellschaft, Stuttgart (DE)

(72) Inventors: Ralf Schmid, Karlsruhe/Gruenwettersbach (DE); Markus Keller, Leonberg (DE); Tobias Hegedusch, Gera (DE); Peter Reutlinger, Knittlingen (DE); Michael Zehender, Heilbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/519,200

(22) Filed: Oct. 21, 2014

(65) Prior Publication Data

US 2015/0107931 A1   Apr. 23, 2015

(30) Foreign Application Priority Data

Oct. 22, 2013   (DE) .......................... 10 2013 111 615

(51) Int. Cl.
| | |
|---|---|
| *B60R 19/52* | (2006.01) |
| *B60R 21/34* | (2011.01) |
| *B60K 11/08* | (2006.01) |
| *B60R 19/22* | (2006.01) |
| *B60J 7/22* | (2006.01) |

(Continued)

(52) U.S. Cl.
CPC . *B60R 21/34* (2013.01); *B60J 7/22* (2013.01); *B60K 11/08* (2013.01); *B60R 19/18* (2013.01); *B60R 19/22* (2013.01); *B60R 19/48* (2013.01); *B60R 2019/1873* (2013.01); *B60R 2019/486* (2013.01); *B60R 2021/343* (2013.01)

(58) Field of Classification Search
CPC .............. B60R 21/34; B60R 2021/343; B60R 2019/486; B60R 2019/1873; B60R 19/18; B60R 19/22; B60R 19/48; B60K 11/08
USPC ............ 296/187.04, 193.09, 193.1; 180/68.1, 180/68.4, 68.6; 293/109, 120–122
See application file for complete search history.

(56) References Cited

U.S. PATENT DOCUMENTS

| 7,114,587 B2 * | 10/2006 | Mori ...................... B60K 11/04 180/68.3 |
|---|---|---|
| 7,159,911 B2 | 1/2007 | Nguyen et al. |

(Continued)

FOREIGN PATENT DOCUMENTS

| DE | 19926861 | * 9/2004 |
|---|---|---|
| DE | 60314318 | 9/2007 |

(Continued)

OTHER PUBLICATIONS

German Patent Appl. No. 10 2013 111 615.9—German Search Report issued Jul. 14, 2014.

*Primary Examiner* — Dennis H Pedder
(74) *Attorney, Agent, or Firm* — Gerald E. Hespos; Michael J. Porco; Matthew T. Hespos

(57) ABSTRACT

A front module (7) of a motor vehicle has vehicle front-side air guiding element (1) for a vehicle radiator, and has a foam crash element (6) that is positioned in front of the air guiding element (1) on the front side. The air guiding element (1) is fastened to the foam crash element (6) at least in a part region. The front module ensures particularly satisfactory dimensional and positional stabilization of the air guiding element (1).

8 Claims, 1 Drawing Sheet

(51) Int. Cl.
*B60R 19/18* (2006.01)
*B60R 19/48* (2006.01)

(56) References Cited

U.S. PATENT DOCUMENTS

| | | | |
|---|---|---|---|
| 7,410,018 B2 | 8/2008 | Satou | |
| 2001/0026072 A1* | 10/2001 | Sato | B60R 21/34 |
| | | | 293/115 |
| 2002/0129981 A1* | 9/2002 | Satou | B60R 19/12 |
| | | | 180/68.6 |
| 2003/0192727 A1 | 10/2003 | Mori et al. | |
| 2004/0075242 A1* | 4/2004 | Richards | B60D 1/40 |
| | | | 280/478.1 |

FOREIGN PATENT DOCUMENTS

| | | |
|---|---|---|
| DE | 102010014077 | 10/2011 |
| JP | 1-107627 | 7/1989 |
| JP | 2002274430 | 9/2002 |
| JP | 2010221845 | 10/2010 |
| JP | 2011235719 | 11/2011 |

* cited by examiner

FRONT MODULE OF A MOTOR VEHICLE

CROSS-REFERENCE TO RELATED APPLICATION

This application claims priority on German Patent Application No. 10 2013 111 615.9, filed Oct. 22, 2013, the entire disclosure of which is incorporated herein by reference.

BACKGROUND

1. Field of the Invention

The invention relates to a front module of a motor vehicle, in particular of a passenger vehicle, having a vehicle frontside air guiding element for a vehicle radiator. The air guiding element may be connected to the vehicle radiator, and may have a foam crash element positioned in front of the air guiding element.

2. Description of the Related Art

A foam crash element is used in a front module of a motor vehicle to absorb kinetic energy in the case of a crash. The foam crash element may be integrated into a bumper arrangement of the motor vehicle. The vehicle radiator may be a water radiator. The air guiding element is arranged on the front side of the vehicle radiator and is connected to the vehicle radiator. The air guiding element is designed, for example, as an attachment for the vehicle radiator. In particular, the air guiding element is composed of a relatively rigid plastic so that the air guiding element is inherently stable and is attached to the vehicle radiator in a dimensionally and positionally stable manner.

A disadvantage of the relatively rigid material is that the pedestrian protection is not optimum, particular in the case of a leg impact. The relatively rigid air guiding element is formed with the use of a filled plastic, and hence a relatively heavy material is used for the air guiding element.

U.S. Pat. No. 7,159,911 describes a motor vehicle with a bumper arrangement that accommodates a crash element as an insert part.

It is an object of the present invention to provide a module with a particularly satisfactory dimensional and positional stabilization of the air guiding element.

SUMMARY OF THE INVENTION

The invention relates to an air guiding element that is fastened to the foam crash element at least in a part region. The air guiding element therefore is configured for fastening to the vehicle radiator and also for fastening to the crash element at least in a part region. The attachment of the air guiding element to the crash element increases dimensional and positional stabilization of the air guiding element, and also of the foam crash element. This dimensional and positional stabilization of the air guiding element enables the air guiding element to be produced with the use of softer or less rigid and lighter materials. The softer plastic may be an unfilled plastic that improves the pedestrian protection properties considerably, particularly in the case of a crash event with leg impact. The less rigid air guiding element can yield in an improved manner in comparison with a more rigid air guiding element.

As a result of the attachment of the air guiding element to the foam crash element, the foam crash element can also be produced with the use of softer or less rigid and lighter materials, such as an unfilled plastic. Satisfactory dimensional and positional stabilization of the air guiding element is ensured due to the attachment of the air guiding element to the foam crash element.

The air guiding element may be fastened to the crash element by fastening lugs. This configuration enables the air guiding element to be fastened rapidly and simply to the crash element. Moreover, the fastening lugs can be produced particularly simply.

The crash element may have bearing pins for engaging holes in the fastening lugs that are connected to the air guiding element. More particularly, the bearing pins of the crash element merely need to be plugged into the holes in the fastening lugs of the air guiding element. This fastening of the fastening lugs to the bearing pin may take place by a latching connection. To this end, the fastening lug can be provided with a projection that engages behind an undercut of the bearing pin in the mounting position of the fastening lug.

Structurally simplicity can be achieved by having the fastening lugs connected to the air guiding elements via integral hinges. Thus, the fastening lugs and the air guiding element may a single unitary component. More particularly, the fastening lugs may be molded during an injection molding of the plastic air guiding element.

The air guiding element and the foam crash element can be connected to one another with a certain prestress. In this way, the foam crash element may be deformed slightly and placed on the air guiding element with a pressure against the air guiding element. In this position, the air guiding element may be fastened to the foam crash element by the fastening lugs. This prestress or overpressure facilitates conveyor line mounting of the front module. The air guiding element fits rapidly into narrow gaps.

The crash element may be inserted into the air guiding element in a positively locking manner. This positively locked connection further improves dimensional and positional stabilization of the air guiding element on the foam crash element. The foam crash element may contact the air guiding element over a large area, thereby further contributing to optimum dimensional and positional stabilization of the foam crash element and the air guiding element.

The front module may comprise a body-side crossmember in a region in front of the air guiding element and the foam crash element may be mounted in the body-side cross-member. The crossmember may be a constituent part of a bumper arrangement of the motor vehicle.

DETAILED DESCRIPTION

Figure 1:
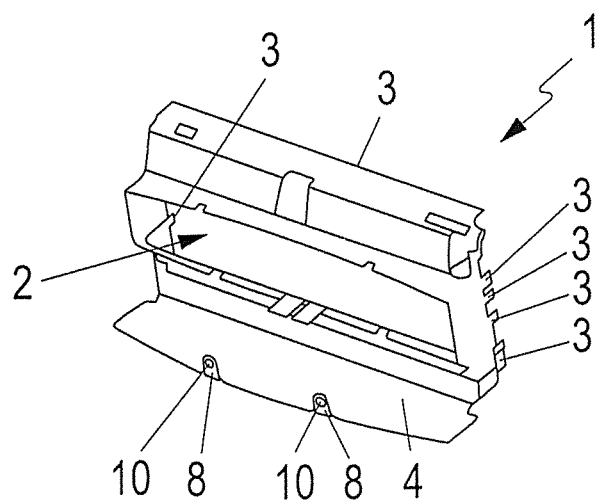
FIG. 1 is a front perspective view of an air guiding element for a vehicle radiator.
Figure 2:
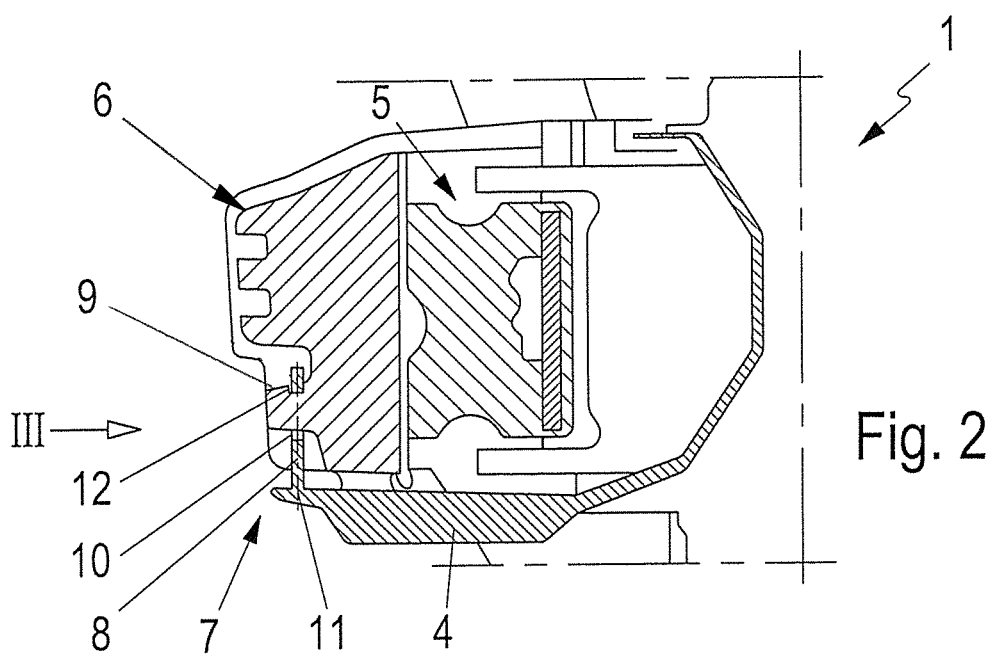
FIG. 2 is a section through the lower region of the air guiding element with a foam crash inserted therein, with the sectional plane running vertically in the longitudinal extent of the motor vehicle (line II-II in FIG. 3).

FIG. 1 shows an air guiding element 1 that is used together with a vehicle radiator (not illustrated). The vehicle radiator is a water radiator. The vehicle, in which the vehicle radiator and the air guiding element 1 are used preferably is a passenger motor vehicle.

The air guiding element 1 has an air passage opening 2 that extends substantially over its width (in relation to the width extent of the vehicle). The extent of the air passage opening 2 in the width direction is substantially greater than that in the vertical direction.

The air guiding element 1 is a plastic injection molded part made as an unfilled plastic and therefore is softer and less stiff than a plastic part made from filled plastic. Additionally, the air guiding element 1 is relatively light. The end of the air guiding element 1 that faces away from the front of the vehicle has various receptacles 3 or projections for latching connection to the vehicle radiator. The air guiding element 1 is plugged onto the vehicle radiator in the region of the receptacle/projections 3 to achieve a relatively rigid connection therebetween.

A horizontal plate 4 is provided at the forwardly facing side of the air guiding element 1, and hence at the side facing away from the radiator. A body-side crossmember 5 is arranged above the plate 4 and a foam crash element 6 is arranged at a front side of the body-side crossmember 5 in a space above the plate 4.

At least the air guiding element 1 and the crash element 6 form a front module 7 of the motor vehicle.

The foam crash element 6 is positioned in front of the air guiding element 1 and is fastened to the plate 4 of the air guiding element 1. The fastening takes place by fastening lugs 8. More particularly, the foam crash element 6 has bearing pins 9 for plugging in holes 10 in the fastening lugs 8 that project from the plate 4 of the air guiding element 1. The respective fastening lug 8 is connected to the air guiding element 1 via an integral hinge 11.

Figure 3:
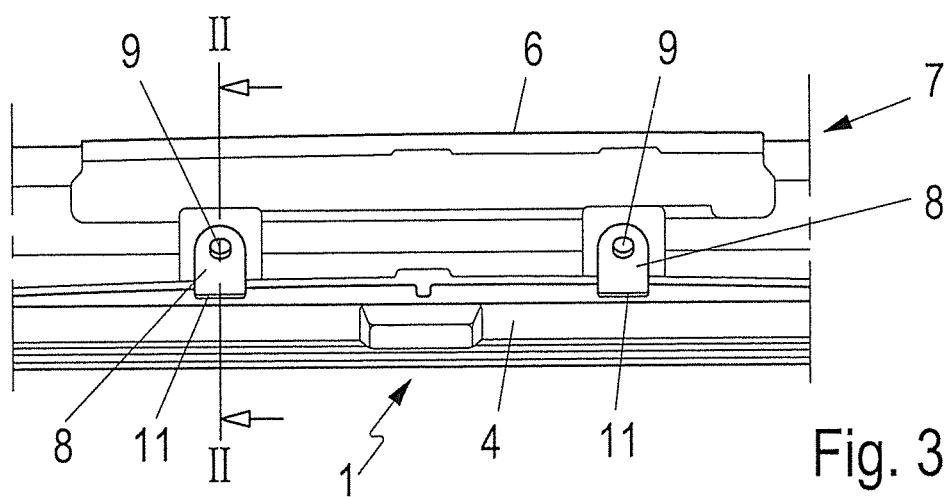
FIG. 3 is a front elevational view taken along line III in FIG. 2.

As can be gathered from the illustration in FIG. 3, the foam crash element 6 is inserted into the air guiding element 1 in a positive locking manner, specifically in the region of the plate section 4. Here, the foam crash element 6 makes contact with the plate 4 of the air guiding element 1 over a large area.

The air guiding element 1 and the foam crash element 6 are formed from unfilled plastic, and therefore are of light and relatively soft or less rigid configuration. This is advantageous for pedestrian protection properties, in particular in the case of a leg impact.

The bearing pins 9 of the foam crash element 6 are provided with undercuts 12 for receiving parts of the fastening lugs 8 adjacent the holes 10 to ensure a permanent and secure connection between the air guiding element 1 and foam crash element 6.

What is claimed is:

1. A front module of a motor vehicle, comprising:
    a vehicle front-side air guiding element for a vehicle radiator having a vertical portion with an air passage opening and a horizontal plate projecting forward from a lower end of the vertical portion in a longitudinal direction of the motor vehicle, at least one fastening lug hinged integrally at a front part of the horizontal plate, the at least one fastening lug having a hole extending therethrough in the longitudinal direction of the motor vehicle; and
    a foam crash element positioned above the horizontal plate, at least one bearing pin projecting forward from the foam crash element and inserted through the hole in the at least one fastening lug to fasten the foam crash element to the air guiding element.

2. The front module of claim 1, wherein the foam crash element is inserted into the air guiding element in a positively locking manner.

3. The front module of claim 1, wherein the foam crash element makes contact with the air guiding element over a large area.

4. The front module of claim 1, further comprising a body-side crossmember positioned in front of the vertical portion of the air guiding element, the foam crash element being mounted on a front side of the body-side crossmember so that the foam crash element is held between the body-side cross member and the fastening lug.

5. The front module of claims 1, wherein the air guiding element and the foam crash element are formed using an unfilled plastic.

6. A front module of a motor vehicle to be mounted to a vehicle radiator, the front module comprising:
    a body-side crossmember;
    an air guiding element having a vertical portion with a lower part rearward of the body-sized crossmember and an upper portion defining an air passage opening, a horizontal plate projecting forward from the lower part of the vertical portion in a longitudinal direction of the motor vehicle and extending beneath the body-sized crossmember, the horizontal plate having at least one fastening lug with a hole extending therethrough in the longitudinal direction of the motor vehicle; and
    a foam crash element positioned above the horizontal plate and mounted on a front side of the body-side crossmember, at least one bearing pin projecting forward from the foam crash element and inserted through the hole in the at least one fastening lug to fasten the foam crash element to the air guiding element, wherein
    the foam crash element is held between the body-side crossmember and the fastening lug.

7. The front module of claim 6, wherein each of the respective fastening lugs is connected to the air guiding element via an integral hinge.

8. The front module of claim 6, wherein the foam crash element is inserted into the air guiding element in a positively locking manner.

* * * * *